UNITED STATES PATENT OFFICE.

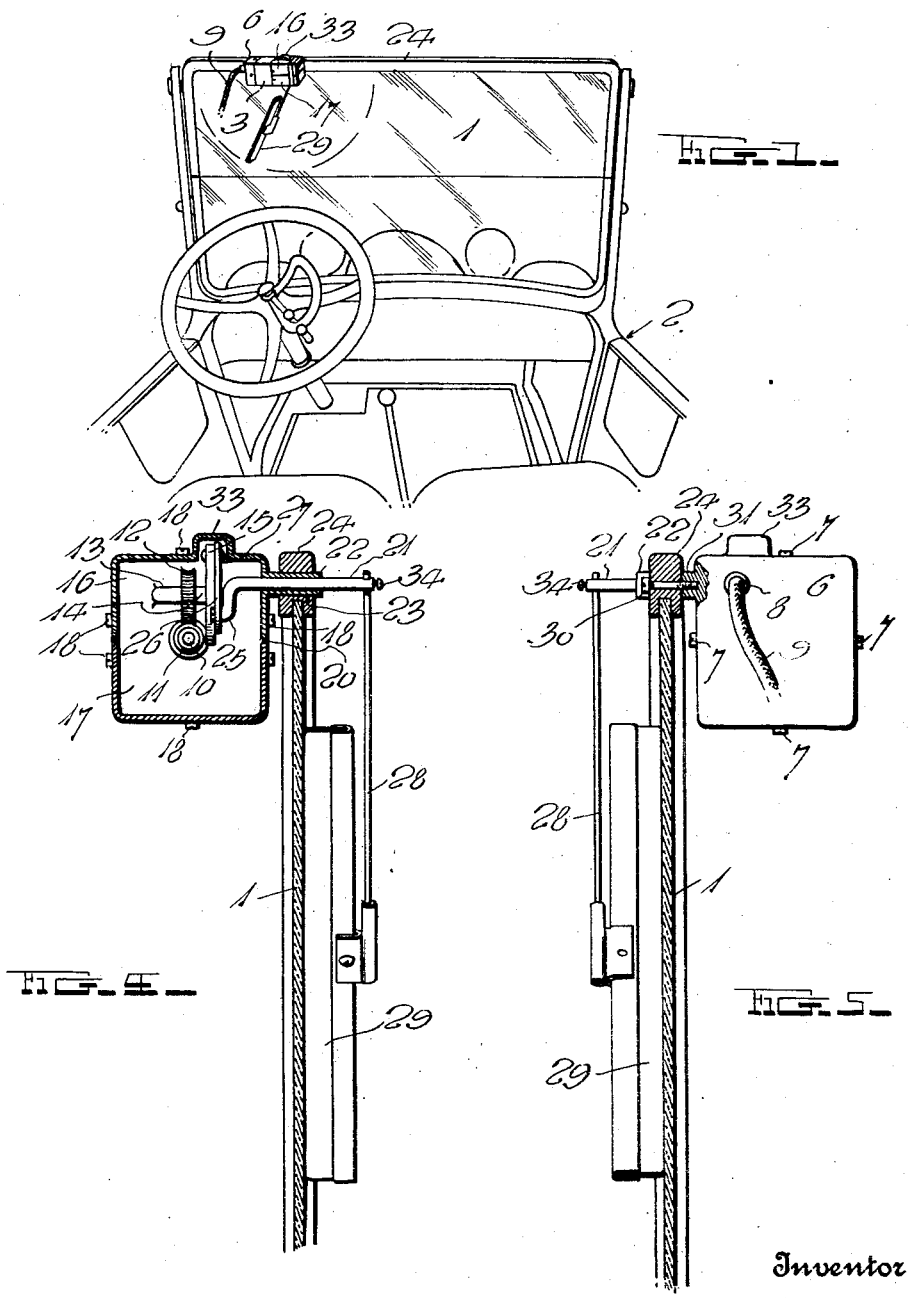

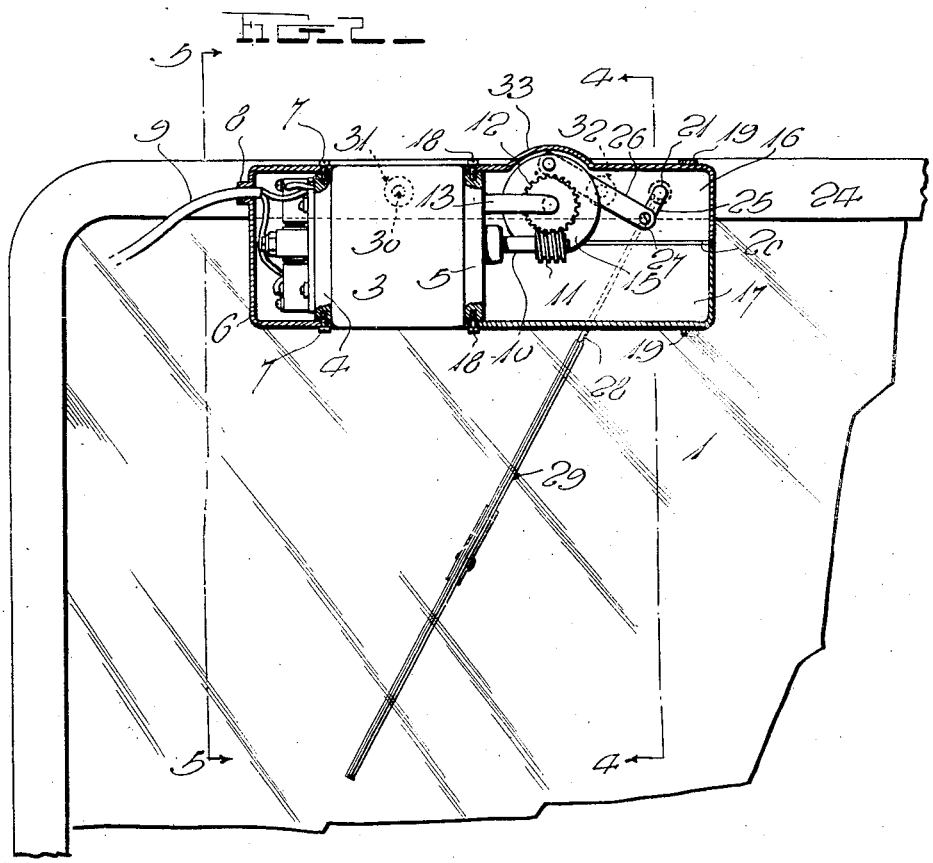
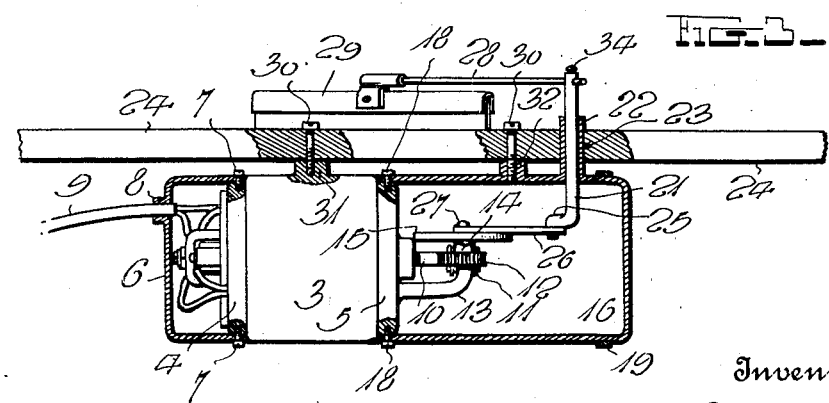

BENNETT ROCKMAN, OF BOSTON, MASSACHUSETTS.

WINDSHIELD WIPER.

1,403,710. Specification of Letters Patent. Patented Jan. 17, 1922.

Application filed August 25, 1921. Serial No. 495,161.

*To all whom it may concern:*

Be it known that I, BENNETT ROCKMAN, a citizen of the United States, residing at Boston, in the county of Suffolk and State of Massachusetts, have invented certain new and useful Improvements in Windshield Wipers; and I do declare the following to be a full, clear, and exact description of the invention, such as will enable others skilled in the art to which it appertains to make and use the same.

This invention relates to an improved wiper for use in connection with a windshield so that rain, snow and other similar matter can be wiped from the face of the windshield and a clear space thus provided so that the driver of an automobile can readily see through the windshield.

The principal object of the invention is to provide novel means for mounting the device on the windshield frame, including a tubular arm extending through said frame and forming a bearing for the wiper shaft, and means also passing through the frame to secure the device against pivotal movement about said tubular arm as well as preventing withdrawal of said arm from the frame.

Another object of the invention is to provide a device of the character described which will be simple in construction and efficient in operation and so constructed that it can be readily taken apart for cleaning when necessary.

This invention is illustrated in the accompanying drawings, wherein:

Figure 1 is a perspective view showing a portion of an automobile body with the improved cleaning device applied to the windshield.

Figure 2 is an enlarged view showing the device applied to the windshield and shown partially in elevation and partially in longitudinal section.

Figure 3 is a view showing the cleaner partially in top plan and partially in longitudinal section.

Figure 4 is a transverse sectional view taken substantially along the line 4—4 of Fig. 2.

Figure 5 is a sectional view taken along the line 5—5 of Fig. 2.

This device is to be used in connection with the windshield 1 of an automobile 2 and in the present illustration is shown applied to the windshield of an automobile body of the touring car type. It is to be understood however that it can be applied in a like manner to the windshield of a sedan or any other vehicle. This device is provided with a motor 3 which will have a conventional construction and will have its casing provided with reduced end portions 4 and 5. A cap 6 fits upon the reduced rear end portion of this casing 3 and is releasably secured by screws 7 and this cap is provided with a perforated boss 8 so that the power wire 9 may pass through the wall of the cap for proper connection with the terminals of the motor. This cap 6 protects the brushes and other parts of the motor from exposure to the weather and the motor will thus be protected from injury by dampness and dust in the air.

The motor shaft 10 extends beyond the forward end of the motor casing and is provided with a worm 11 which meshes with a worm wheel 12 rotatably mounted upon a bearing arm 13 which extends from the forward end of the motor casing. This worm gear 12 is provided with a hub extension 14 upon which will be rigidly mounted a disk 15 and it will thus be seen that when the motor is in operation, the disk 15 will rotate with the worm gear 12. A shell fits upon the reduced forward end portion 5 of the motor casing and is provided with upper and lower sections 16 and 17 which are releasably held in engagement with each other and are releasably secured upon the reduced forward end portion of the motor casing by fastener screws 18. The upper and lower sections have been shown releasably held in engagement with each other by means of a band 19 but it is to be understood that this is a conventional structure and any other means could be substituted for releasably connecting the two sections. A gasket 20 will be provided between the two sections so that a tight joint will be formed to prevent water from working into the shell between the upper and lower sections thereof and to permit the gearing to run in grease. From an inspection of Fig. 3, it will be seen that a rocker shaft 21 is rotatably mounted in a bearing arm 22 which extends from the upper section of the shell and is to be passed through an opening 23 which will be drilled in the upper strip 24 of the windshield frame. This rocker shaft 21 is provided with a crank portion 25 at its inner end and this crank portion 25 is engaged by a pitman link 26 which is connected with the disk 15 as shown at 27 so that as the disk rotates, rocking movement will be imparted to the rocker shaft. It will thus be seen that the handle rod 28 which is adjustably connected with the outer end portion of this rocker shaft will receive oscillating movement and the squeegee 29 will move across the glass of the windshield and will wipe the outer face of this glass and thus remove snow and rain water from the glass. A clear space will thus be provided so that the driver of the automobile can readily see through the windshield.

When this device is to be installed, the opening 23 will be drilled in the upper strip of the windshield and the device will be put in place with the hollow bearing arm 22 extending through this opening 23. Other openings will then be drilled in the windshield frame and the machine screws will be passed through these openings and screwed into the threaded openings formed in the bosses 31 and 32 which extend from the motor casing 3 and upper section of the shell. From an inspection of Figs. 2, 4 and 5, it will be seen that with the device mounted as set forth, the device will not extend above the upper edge of the windshield except for the pocket 33 into which the upper portion of the disk 15 extends. This pocket 33 is spaced from the windshield a sufficient distance so that it will not interfere with the automobile top properly engaging the windshield and fitting in close contact with the windshield. After the bearing arm 22 has been passed through the opening 23 and the securing screws 30 put in place, the handle rod 28 of the squeegee will be passed through the opening formed in the outer end portion of the rocker shaft and the set-screw 34 will then be tightened to secure this handle in rigid engagement with the rocker shaft. The wires 9 will then be connected with a suitable source of electric current and when this current is turned on, the motor will rotate and rotary movement will be transmitted to the disk 15. As this disk 15 rotates, the rocker shaft will be turned first in one direction and then in a reverse direction and the squeegee will be swung back and forth across the glass thus removing snow and rain water from the glass and leaving a clear space through which the driver of the automobile can readily see. When it is desired to make any repairs to the mechanism within the shell, it is simply necessary to remove the band 19 and then remove the securing screws 18 for the lower shell section 17. This lower section 17 can then be removed and the necessary repairs made. The lower section can then be put back in place and secured. If the brushes of the motor need replacing, the cap 6 can be removed and the brushes cleaned or replaced and the cap then put back in place and again secured by means of the screws 7. If it is desired to remove this device from a windshield and mount it in connection with another windshield, it is simply necessary to remove the screws 30 and squeegee and the bearing arm can then be drawn out of the opening 23 and the device thus bodily removed from the windshield. It will thus be seen that there has been provided a windshield cleaner which is so constructed that it can be readily mounted upon a windshield in such a manner that it will not prevent the top from fitting in close contact with the upper edge of the windshield and further that the device is so constructed that it can be readily applied to the windshield of a sedan or similar type of automobile body.

I claim:

A windshield cleaner comprising a casing adapted to contact with the rear side of a windshield frame, a tubular bearing integral with and extending forwardly from said casing for passage through an opening in the upper bar of the frame to support the greater part of the casing's weight, said bearing being disposed at the upper portion of said casing, whereby to prevent projection of the casing above the frame sufficiently to interfere with the vehicle top, a fastener spaced laterally from said bearing and adapted for passage through another opening in the frame to engage the casing and prevent pivotal movement thereof about said bearing and to hold said casing against said frame, a rock shaft mounted in said tubular bearing and carrying a windshield wiper, and means within said casing for oscillating said shaft.

In testimony whereof I have hereunto set my hand.

BENNETT ROCKMAN.